United States Patent
Sebeni et al.

(10) Patent No.: US 8,547,913 B2
(45) Date of Patent: Oct. 1, 2013

(54) APPARATUS AND METHODS FOR SIGNAL RECEPTION BASED ON NETWORK LOAD ESTIMATIONS

(75) Inventors: Johnson Sebeni, Fremont, CA (US); Yu-Lin Wang, Fremont, CA (US); Jianxiong Shi, Pleasanton, CA (US)

(73) Assignee: APPLE Inc., Cupertino, CA (US)

( * ) Notice: Subject to any disclaimer, the term of this patent is extended or adjusted under 35 U.S.C. 154(b) by 536 days.

(21) Appl. No.: 12/698,901

(22) Filed: Feb. 2, 2010

(65) Prior Publication Data
US 2011/0188458 A1    Aug. 4, 2011

(51) Int. Cl.
*H04W 4/00* (2009.01)

(52) U.S. Cl.
USPC .......................................... 370/329; 455/522

(58) Field of Classification Search
USPC ............. 370/329, 252, 229, 208, 230, 338, 370/332, 349, 328, 341, 310, 342; 455/522, 455/453
See application file for complete search history.

(56) References Cited

U.S. PATENT DOCUMENTS

| | | | |
|---|---|---|---|
| 6,529,482 B1 * | 3/2003 | Lundby | 370/252 |
| 7,328,019 B2 | 2/2008 | Nishikawa et al. | |
| 8,045,469 B2 * | 10/2011 | Nagy et al. | 370/235 |
| 2002/0119782 A1 | 8/2002 | Voyer | |
| 2006/0234755 A1 | 10/2006 | Jonsson et al. | |
| 2007/0121552 A1 | 5/2007 | Lindoff | |
| 2008/0070564 A1 | 3/2008 | Li et al. | |
| 2008/0188235 A1 * | 8/2008 | Kim et al. | 455/453 |
| 2008/0214173 A1 | 9/2008 | Preiss et al. | |
| 2009/0034484 A1 | 2/2009 | Kong et al. | |
| 2009/0213748 A1 | 8/2009 | Vanganuru et al. | |

FOREIGN PATENT DOCUMENTS

| | | |
|---|---|---|
| EP | 1173035 | 1/2002 |
| WO | 2008/117203 | 10/2008 |

OTHER PUBLICATIONS

Toward a Framework for Power Control in Cellular Systems; Zvi Rosberg and Jens Zander; Wireless Networks 4 (1998) 215-222.
Gareth B. Middletown: "Analysis of Receiver Quantization in Wireless Communication Systems Theory and implementation", Rice University, Apr. 18, 2007.

* cited by examiner

*Primary Examiner* — Chi Pham
*Assistant Examiner* — Alexander O Boakye
(74) *Attorney, Agent, or Firm* — Fay Kaplun & Marcin, LLP

(57) ABSTRACT

Methods and apparatus for correcting quantization errors in signal reception based on estimated network loading including solutions for preserving cellular network performance in low noise, high interference environments. In one embodiment, a data channel is amplified with respect to other signals based on network load during periods of relatively low network utilization. Dynamic modification of the data channel's power level is configured to overcome quantization errors, rather than the true noise floor (which is insignificant in low noise environments). Such solutions provide both the fidelity necessary to enable high degrees of unwanted signaling rejection, while still preserving data channel quality.

24 Claims, 10 Drawing Sheets

APPARATUS AND METHODS FOR SIGNAL RECEPTION BASED ON NETWORK LOAD ESTIMATIONS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to methods and apparatus for adjusting signal reception based on estimations of network load.

2. Description of Related Technology

In telecommunications networks, "orthogonality" refers to systems, processes, signaling, effects, etc. which exhibit desirable exclusionary properties. Orthogonal properties are heavily leveraged in multiple access communication schemes. Consider an aggregate signal composed of several orthogonal constituent signals. Ideally, a receiver can extract a desired signal from the aggregate signal, and reject the other orthogonal constituent signals. In this example, each of the orthogonal constituent signals is removable "interference".

For example, CDMA (Code Division Multiple Access) based systems utilize a complex series of orthogonal "spreading codes" to distinguish between each data and control channel. A CDMA signal can be separated into its constituent channels, ideally without interference between the constituent channels (i.e., inter-channel interference or ICI).

In contrast to unwanted orthogonal signaling, true noise is "non-orthogonal" and does not exhibit simple exclusionary properties. For example, true noise includes elements such as nearby interfering systems, thermal noise, transmission effects, etc. Unlike orthogonal signaling, true noise is largely unpredictable and cannot be removed. Generally, true noise must be corrected using error correction techniques, or rendered insignificant to the transmitted signal power.

In typical wireless reception, an RF frontend "conditions" and converts a received RF waveform to a digital representation for subsequent demodulation and/or processing. Most designs for RF frontends implement signal conditioning stages before demodulation and/or processing stages. Also, RF frontends are typically constructed around fixed point arithmetic for cost and simplicity reasons (i.e., a fixed number of digits are used for operations).

Unfortunately, practical design constraints can create artifacts in normal operation. For example, in low noise environments, unwanted orthogonal signals can have much higher transmission power than the desired signal. These unwanted orthogonal signals will dominate the signal conditioning operations. As described in greater detail subsequently herein, such conditions can occur when a mobile device is very close to a sparsely unoccupied base station (or femtocell). Once the unwanted orthogonal signals (such as pilot channels, broadcast channels, etc.) have been removed, the desired signal is significantly under-powered, which can create quantization error effects in fixed point circuitry. Quantization errors can lead to much higher bit error rates (BERs).

Therefore, improved methods and apparatus are needed for handling scenarios where large differences are observed between known interference and desired signals. Such improved methods and apparatus should ideally facilitate successful decoding of signals, regardless of the current cellular conditions. Specifically, new solutions are needed for preserving cellular network performance, in low-noise, high-interference rejection environments.

Furthermore, it is additionally recognized that corresponding improvements are needed to existing hardware. Ideally, implementation of the aforementioned improved methods and apparatus should not require substantial changes to extant transceiver hardware or software. The non-ideal behaviors of hardware-specific implementations should be accounted for in signal conditioning, demodulation, post-processing, etc.

SUMMARY OF THE INVENTION

The present invention satisfies the foregoing needs by providing, inter alia, improved methods and apparatus for adjusting signal reception based on one or more estimations of network load.

In a first aspect of the present invention, a method for improving quantization rejection of at least one signal among a plurality of signals and noise is disclosed. In one embodiment, the plurality of signals includes at least one other known signal and the method includes: transmitting the plurality of signals; receiving information related to an estimated network load based on a measured first attribute; and adjusting the transmission characteristics of at least one but not all of the plurality of signals based on the information.

In one variant, the first attribute comprises a ratio of a first parameter of the network to a second parameter of the network. The first parameter of the network comprises e.g., a common channel power, and the second parameter of the network comprises a total received signal. The network is compliant with the Universal Mobile Telecommunications System (UMTS) standard(s), and the common channel comprises a common pilot channel (CPICH).

In another variant, the method includes comparing the received information to at least one criterion; and based at least in part on the result of the comparing, selectively performing the transmission characteristics.

In a further variant, the act of adjusting the transmission characteristics includes signal amplification.

In yet another variant, the act of adjusting the transmission characteristics includes lowering the constellation order.

In another variant, the act of adjusting the transmission characteristics includes changing the transmission rate.

In still another variant, the act of adjusting the transmission characteristics includes changing one or more feedback parameters.

In a second aspect of the present invention, a method for enhancing the quantization performance of at least one radio signal among a plurality of radio signals is disclosed. In one embodiment, the method includes: transmitting the plurality of radio signals, the transmission having a first radio attribute; receiving information related to a network load based on the first attribute; and adjusting the transmission characteristics of at least one of the plurality of signals based on the information.

In one variant, the network is compliant with the Universal Mobile Telecommunications System (UMTS) standard(s), and the first radio attribute comprises a ratio of a common channel power to a total received signal.

In another variant, the act of generating comprises: comparing the ratio to at least one threshold criterion; and based at least in part on the result of the comparing, selectively performing the adjusting of the transmission characteristics.

In still another variant, the at least one radio signal is a dedicated channel.

In a further variant, the plurality of radio signals includes at least one common signal, at least one unwanted signal, and at least one wanted signal. In one variant, the act of adjusting the transmission characteristics includes signal amplification of the at least one wanted signal. In another variant, the act of adjusting the transmission characteristics includes lowering the constellation order of the at least one wanted signal. In yet another variant, the act of adjusting the transmission characteristics includes changing the transmission rate of the at least one wanted signal. In yet another variant, act of adjusting the transmission characteristics includes changing one or more feedback parameters of the at least one wanted signal.

In a third aspect of the invention, a wireless apparatus is disclosed. In one embodiment, the wireless apparatus includes: a wireless interface, the wireless interface adapted to receive a plurality of signals; logic adapted to determine a network load; a processing device coupled to a memory; and a computer program comprising a plurality of executable instructions resident within the memory. When executed by the processing device, the program: receives a first signaling channel via the wireless interface; requests a second signaling channel; estimates the network load; and transmits information relating to the estimated network load. One or more reception characteristics of the second signaling channel are determined by the information.

In one variant, the wireless interface has multiple fixed point capabilities, and the fixed point capability is a reception characteristic determined by the information.

In another variant, the reception characteristic is a target signal to interference (SIR) level.

In yet another variant, the reception characteristic is negotiated with a serving device.

In still another variant, the information relating to the estimated network load comprises an indication of the first signal channel strength, relative to the plurality of signals strength.

In a fourth aspect of the present invention, a serving apparatus is disclosed. In one embodiment, the apparatus comprises: a wireless interface, the wireless interface adapted to transmit and receive a plurality of signals; a processing device coupled to a memory; and a computer program plurality of executable instructions resident within the memory. When executed by the processing device, the program: receives a network load estimation via the wireless interface; and responsively adjusts one or more transmission characteristics of at least one, but not all, of the plurality of signals.

In a fifth aspect of the invention, a method for compensating for one or more orthogonal signals having much higher transmission power than a user signal is disclosed. In one embodiment, the orthogonal signals result in quantization error in the user signal, and the method comprising: obtaining a network load estimation; and responsively adjusting one or more transmission characteristics of the user signal based at least in part on the network load, the adjusting mitigating the quantization error.

In one variant one or more orthogonal signals comprises a pilot channel, and the adjusting the one or more transmission characteristics of the user signal comprises increasing the transmission power of the user signal.

In a sixth aspect of the invention, a wireless system is disclosed. In one embodiment, the system includes a base station and at least one user device (e.g., mobile device or UE), and the system is adapted to dynamically adjust for quantization errors induced by the noise environment and system parameters by adjusting one or more channel characteristics.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
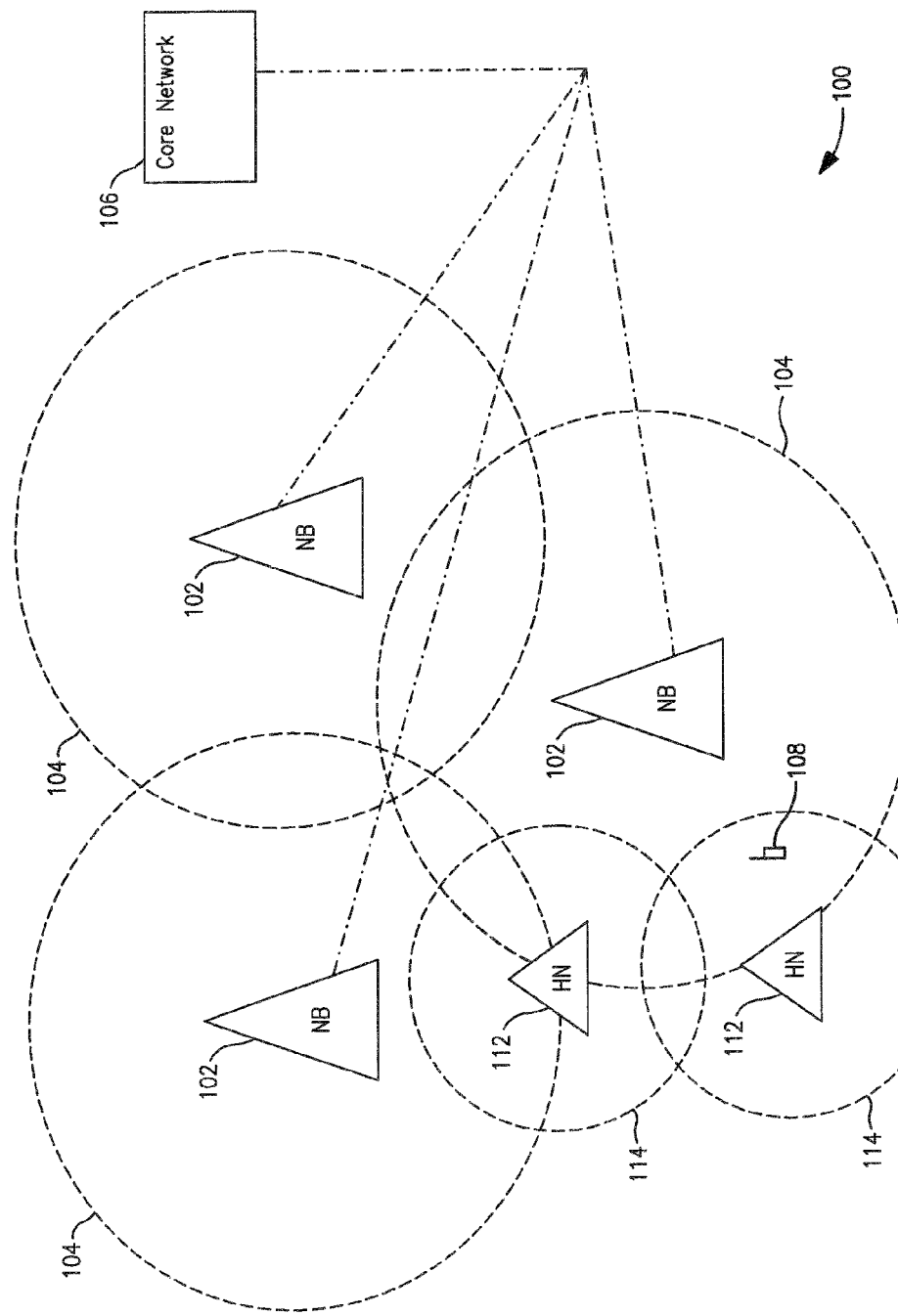
FIG. 1 is a graphical illustration of one embodiment of a prior art Universal Mobile Telecommunications System (UMTS) network comprising a Core Network, a plurality of Base Stations, and a plurality of User Equipment.

Reference is now made to the drawings, wherein like numerals refer to like parts throughout.

Overview

The present invention provides, inter alia, methods and apparatus for adjusting signal reception based on one or more estimations of network load. As described in greater detail hereinafter, one exemplary UMTS-specific implementation obviates the effects of quantization errors attributed to low noise, high interference environments. Specifically, in low noise environments, the UMTS Common Pilot Channel (CPICH) becomes the predominant factor in Automatic Gain Control (AGC) calculations, thus when the CPICH is removed, the remaining Dedicated Physical Channel (DPCH) experiences severe (deleterious) quantization effects.

Thus, in one aspect of the present invention, the receiver monitors the load of the network, and requests "enhanced" operation during periods of low network load. In one embodiment, during such periods of low network load, the receiver requests increased power levels for its data channels. For instance, in one UMTS-specific implementation, the UE requests increased levels of DPCH power, when the monitored ratio of CPICH to the total power spectral density (CPICH/$N_0$) exceeds a specified threshold. Large values of the foregoing ratio are reasonably correlated with periods of low network usage; the total power spectral density includes the power allocated to other users.

More generally, various aspects of the present invention encompass a wide range of solutions for both monitoring network load, and adjusting signal reception. For example, one exemplary embodiment describes a UMTS UE (e.g., mobile device) measuring the CPICH/$N_0$. Other alternative measurements include detection of other resources, other transmitters, other receivers, etc. Yet other embodiments are described suitable for other networking technologies, and topologies. Similarly, a UMTS BS adjusting the DPCH power level with respect to the CPICH is also described. Additional variations and alternate embodiments are configured for different coding schemes, transmission rates, hardware operation, etc.

Serving apparatus and wireless device apparatus suitable for embodying various other aspects of the present invention are also described. For example, in one embodiment, a serving UMTS NodeB can dynamically adjust its DPCH and CPICH power levels to counter expected quantization error effects. In yet other examples, the serving UMTS NodeB can dynamically adjust constellation order, transmission rate, etc.

Exemplary receiver apparatus are also disclosed. For instance, one embodiment of a UMTS UE monitors and notifies the UMTS NodeB of network loading conditions.

Business methods and modes of network optimization are also described herein.

DETAILED DESCRIPTION OF EXEMPLARY EMBODIMENTS

Exemplary embodiments of the present invention are now described in detail. While these embodiments are primarily discussed in the context of a wireless network having a CDMA air interface, and more specifically to a UMTS-specific implementation thereof, it will be recognized by those of ordinary skill that the present invention is not in any way limited to such CDMA networks or to any particular context (such as the aforementioned UMTS specific implementations). In fact, the principles of the present invention may be readily adapted to any wireless network, even non-cellular networks, in which the network load is related to unwanted interference levels, thereby affecting the processing of the desired signal.

For example, it is appreciated that OFDMA (Orthogonal Frequency Domain Multiple Access) based systems must decode the entire radio resource band (including unwanted time-frequency resources), to successfully extract the desired time-frequency resources. Common implementations of an OFDMA front end utilize a large Fast Fourier Transform (FFT)/Inverse Fast Fourier Transform (IFFT) component to extract channels of interest. Since all time-frequency resources are transformed simultaneously, signal conditioning is performed in aggregate for both desired and undesired time-frequency resources.

Exemplary UMTS Network Architecture—

In the following discussion, a cellular radio system is described that includes a network of radio cells each served by a transmitting station, known as a cell site or base station (BS). The radio network provides wireless communications service for a plurality of user equipment (UE) transceivers. The network of BSs working in collaboration allows for wireless service which is greater than the radio coverage provided by a single serving BS. The individual BSs are connected by another network (in many cases a wired network), which includes additional controllers for resource management and in some cases access to other network systems (such as the Internet or MANs).

In a UMTS system, a base station is commonly referred to as a "NodeB". The UMTS Terrestrial Radio Access Network (UTRAN) is the collective body of NodeBs along with the UMTS Radio Network Controllers (RNC). The user interfaces to the UTRAN via a UE, which in many typical usage cases is a cellular phone or smartphone. However, as used herein, the terms "UE", "client device", and "end user device" may include, but are not limited to, cellular telephones, smartphones (such as for example an iPhone™), wireless-enabled personal computers (PCs), such as for example an iMac™, Mac Pro™, Mac Mini™ or MacBook™, and minicomputers, whether desktop, laptop, or otherwise, as well as mobile devices such as handheld computers, PDAs, wireless personal media devices (PMDs), such as for example an iPod™, or any combinations of the foregoing.

FIG. 1 illustrates an exemplary UMTS cellular system 100, with a focus on the radio access network (RAN).

The system 100 includes one or more base station towers 102 (also known as NodeBs (NBs)), that are set at various fixed geographic locations. Such NodeBs may also be generally referred to as a "macrocell". Each NodeB provides an area of service coverage 104. The network operator manages radio access network operation via a Core Network 106. The unified Core Network provides authentication, accounting, and authorization (AAA) services, and in some cases, access to external networks (e.g. such as IP Multimedia Subsystems (IMS) services as specified by the 3GPP). A first UE 108 is shown, operating within the coverage of the RAN 100.

Furthermore, incipient wireless standards support new network entities commonly referred to as "femtocells"; a femtocell provides similar functionality to a macrocell, but at a reduced capability and cost, and may be portable versus fixed. Femtocells may be purchased by a customer for personal use. The combination of macrocells and femtocells provides a seamless cohesive service from a network operator. Within the UMTS network, femtocells are generally referred to as Home NodeBs (HNBs) 112 and have corresponding coverage areas 114.

Each of the cells (macrocells and femtocells where present) are directly coupled to the Core Network 106 e.g., via broadband access. Additionally, in some networks, the cells may coordinate with one another, via secondary access. In the illustrated RAN 100 of FIG. 1, the femtocells are connected to the Core Network, but are not linked to the other cells of the network. Unlike the broader coverage of the macrocells, a femtocell is generally focused on improving service to a few subscribers. Accordingly, femtocells may have settings and limitations which are not applicable for the general population. Such non-standard settings are generally disclosed, at least in part, within the pilot channel public broadcasts. Consequently, the macrocells and the femtocells may have different pilot channel powers, payloads, and operation.

While the following discussions are presented in terms of the downlink path from the NodeB 102 to the UE 108, it is appreciated that analogous processes and structures can be readily implemented within the uplink path (from the UE to the NodeB) by one of ordinary skill in the art, given the contents of the present disclosure.

Common Pilot Channel (CPICH) and Dedicated Physical Channel (DPCH)—

The UMTS network utilizes a Common Pilot Channel (CPICH) to provide all user equipment (UE) with a common synchronization signal. Generally, pilot channels are used for, inter alia, initial "wake-up" and search, estimating potential base station (BS) service reception for handover (i.e. handoff), etc. Various approaches to pilot channel operation are evidenced throughout the prior art. For example, in Interim Standard 95 (IS-95, CDMA), pilot channel measurements are used by mobile devices to initially determine the existence of base stations, and/or support multipath compensation.

The importance of the CPICH to network management and network discovery warrants a disproportionate share of NodeB 102 transmit resources. In extreme cases, the UMTS CPICH transmit power can exceed one-fifth (20%) of the total NodeB transmit power. The high power of the CPICH ensures that terminal equipment 108 within the coverage area (even at the very edges) 104 can receive synchronization information. More generally, common "control" channels are the most robust and simplest coded channels of the network.

The UMTS network also provides Dedicated Physical Channels (DPCH) to provide channels for control (Dedicated Physical Control Channel (DPCCH)), and data (Dedicated Physical Data Channel (DPDCH)) messaging devoted to single UEs 108. In contrast to the CPICH, the DPCH is only received by one recipient UE. Non-recipient UEs cannot decode other DPCHs. However, the exclusivity of DPCHs still affects overall network efficiency. Each additional DPCH increases the interference experienced by all non-recipients. Therefore, network operators generally maximize system operation by limiting DPCHs to the minimum power necessary for communicating with the intended UE.

UMTS Power Control—

UEs 108 and NodeBs 102 collaborate to control DPCH power using both open and closed loop power control. DPCH target signal quality levels are set and dynamically managed according to existing radio conditions. For example, in noisy radio environments, a NodeB boosts DPCH transmit power to improve UE reception. In lower noise environments, the DPCH transmit power is lowered. Power control for Dedicated Physical Channels (DPCH) is separated into two (2) loops: (i) outer loop power control, and (ii) inner loop power control.

Outer loop power control manages power control for long term variations in the radio environment. The UE 108 and the NodeB 102 negotiate and manage a target SIR (Signal to Interference Ratio) within a Radio Resource Connection (RRC) management protocol. The SIR is a predictor of block error ratio (BLER) performance; for example, if the received SIR is less than the SIR target, then the BLER is generally poor. The UE and NodeB agree on a SIR target based on the BLER of a reference physical channel (DPCH). Within the reference physical channel, there can be one or more transport channels. The transport channel requiring the smallest block error rate for acceptable quality is the reference for the SIR target. The BLER of the transport channel is the number of bit errors within a block or frame after channel decoding and error correction.

Inner loop power control (also known as fast closed-loop power control) is adapted to protect against fast fading. Inner loop power control uses the same targets set by outer loop control (i.e., derived from post-processing analysis); however, control is based on the physical radio connection (PHY layer), and can cycle much faster so as to compensate for fast fades and the like.

In prior art UMTS operation, the target SIR is determined after post-processing gains (removing orthogonal interference components, and applying spreading gain, etc.); the target SIR is based only on the power of the received DPCH signal relative to true noise. For example, in one embodiment, DPCH SIR is measured based on a pilot field transmitted within the DPCH. This pilot has a known pattern. The UE can estimate the signal strength of the DPCH by performing an average of the signal power in the pilot field according to Equation (1) below:

$$S=I^2+Q^2 \qquad (\text{Eqn. 1})$$

Where:
S=Signal Strength
I=Magnitude of In-phase Components; and
Q=Magnitude of Quadrature Components.

Additionally, the CPICH noise can be estimated from a variance of these pilot fields or measured from the CPICH according to Equation (2) below:

$$N_{CPICH}=\text{var(CPICH power)} \qquad (\text{Eqn. 2})$$

The noise affecting the CPICH is common to all orthogonal channels. Accordingly, once the noise is measured from the CPICH, the processed noise seen by the DPCH can be derived from $N_{CPICH}$, based on the difference in Spreading Factors (SF) (or processing gain). For example, $N_{DPCH}$ could be calculated per Equation (3) below:

$$N_{DPCH}=(SF_{DPCH}/SF_{CPICH})*N_{CPICH} \qquad (\text{Eqn. 3})$$

Where:
$N_{DPCH}$=Noise of DPCH;
$SF_{DPCH}$=Spreading Factor of DPCH;
$SF_{CPICH}$=Spreading Factor of CPICH; and
$N_{CPICH}$=Noise of CPICH Accordingly, the DPCH SIR is then expressed according to Equation (4) below:

$$SIR_{DPCH}=S/N_{DPCH} \qquad (\text{Eqn. 4})$$

Automatic Gain Control (AGC)—

In addition to power control, typical UMTS receivers 108 also implement various forms of signal conditioning, including Automatic Gain Control (AGC). In typical transceiver designs, an Automatic Gain Control (AGC) module amplifies or attenuates the total received signal to maintain a relatively constant signal for receiver digital baseband processing. Unlike power control, AGC operation is performed without any knowledge of signal quality; in fact, AGC occurs in lockstep with Analog to Digital (A/D) conversion.

Figure 2:
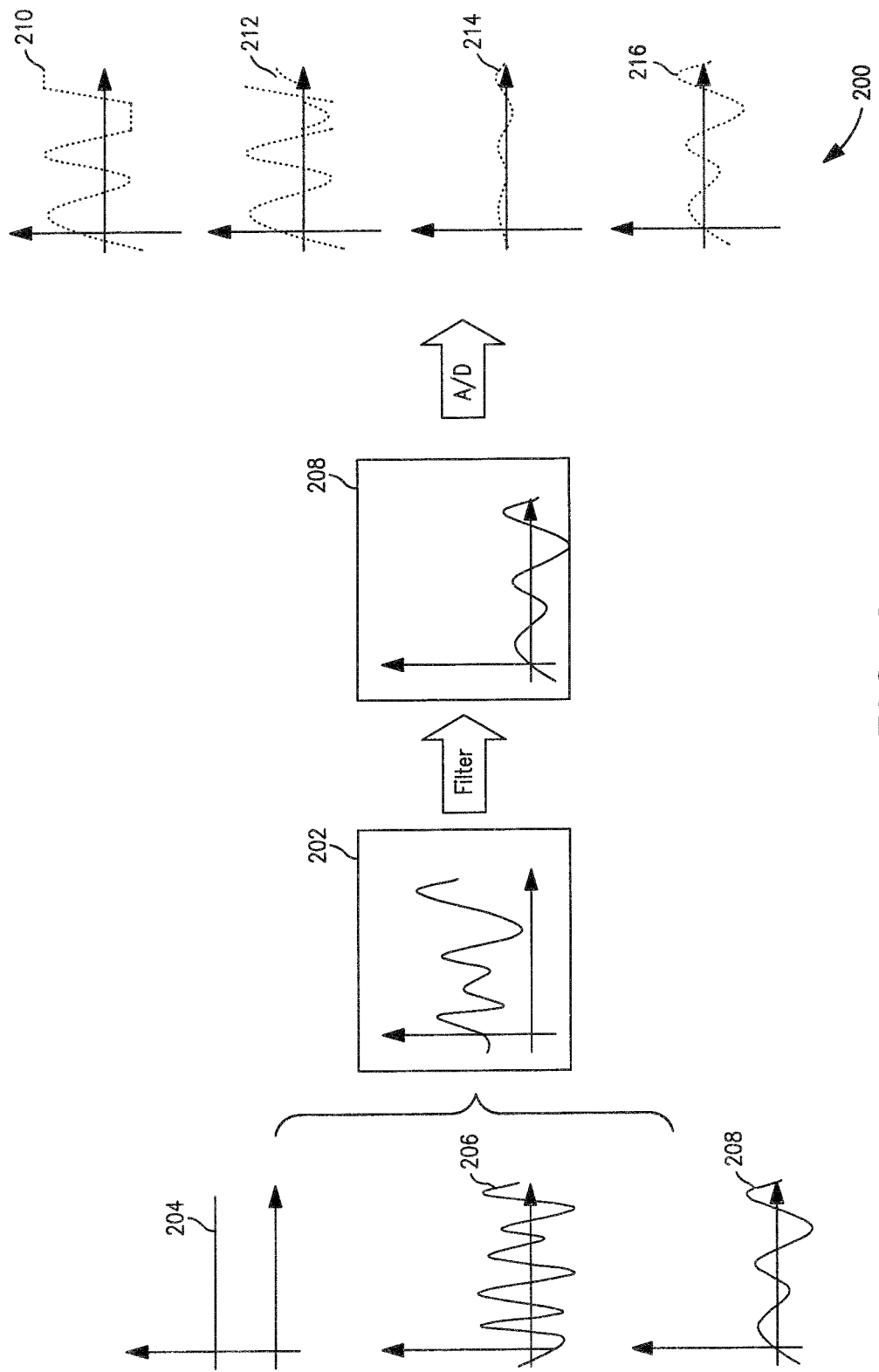
FIG. 2 is a prior art graphical illustration of Automatic Gain Control (AGC) and Analog-to-Digital Conversion (A/D) methods emphasizing the effects of proper and improper AGC and A/D operation.

Referring now to FIG. 2, various stages 200 of signal conditioning are presented to emphasize the effects of proper and improper AGC and A/D operation. Consider the received analog waveform 202. The waveform has several components: (i) a DC offset 204, (ii) high and low frequency noise 206, and in-band components 208. The RF frontend can remove both the DC offset and unwanted frequency components in initial filter stage(s). The in-band frequency components 208 are brought to baseband e.g., by mixing and filtering out the carrier frequency.

Once the desired frequency components 208 are brought to baseband, the RF frontend must amplify or attenuate the signal for conversion to the digital representation, such that meaningful digital processes can be performed. RF frontends are generally implemented within fixed point arithmetic. In contrast, floating point arithmetic represents numbers with a mantissa and exponent. Fixed point arithmetic can be signed, unsigned, complement, etc. Ideally, the entire dynamic range of the conditioned analog waveform can be fully represented within a fixed point A/D conversion. Fixed point operations have a set range, for example a fixed point eight (8) bit word can only represent 256 numbers (i.e., $2^8$=256). Consequently, the quanta or minimum unit must be carefully chosen to minimize the effects of quantization error.

The first and second digital representations (210, 212 on FIG. 2) of the analog waveform illustrate the effects of over-amplification, and/or too small of quanta, in different implementations. The first fixed point representation 210 has difficulty representing peaks and troughs of the waveform; these artifacts saturate the fixed point A/D components, causing distortions or "clipping" effects.

The second fixed point representation 212 illustrates a different phenomenon which may also be common among alternate receiver implementations. Instead of "clipping" the over-amplified signal, the second fixed point representation "rolls over" creating false artifacts in signal representation. Roll over or wrapping is caused by improper overflow operation; for example, consider unsigned fixed point arithmetic having four (4) bits. The maximum value of #1111b (31) cannot handle #10000b (32); thus, the value is truncated to #0000b (0).

Clearly, both the first and second representations 210, 212 are undesirable. In contrast to the first and second representations, the third fixed point representation 214 of the analog waveform illustrates the effects of under-amplification, or too large of a quanta. While the third representation does not generate any "artifacts", the waveform is not fully represented. Consequently, quantization error (i.e., the difference between the actual analog value and quantized digital value) directly causes symbol misinterpretation, and lower effective bit rates (i.e., due to higher BER).

Lastly, the fourth fixed point representation 216 of the analog waveform of FIG. 2 illustrates a properly amplified waveform. The fourth representation can capture the full dynamic range of the analog waveform, while still providing sufficient clarity to prevent bit errors in demodulation and processing operations. In some implementations, a small degree of either clipping or margin may be tolerated or even preferable (e.g., to capture more signal fidelity, compensate for fading, bursty transmissions, etc.).

Within the foregoing discussion, it is readily appreciated that the relative complexity and sensitivity of the radio significantly impact the requirements for fixed point A/D component selection. Simple radio waveforms in low-noise operating environments, etc. can support fixed point components with less resolution. Similarly, complex waveforms, and/or noisy operating environments, require greater bit resolution. For example, it is not uncommon for CDMA type receivers to have A/D components supporting eight (8) or even ten (10) bit resolution. Eight (8) bits of resolution can represent up to 256 (i.e., $2^8$) distinct gradation levels. Ten (10) bits of resolution can represent up to 1024 (i.e., $2^{10}$) distinct gradation levels.

Figure 3:
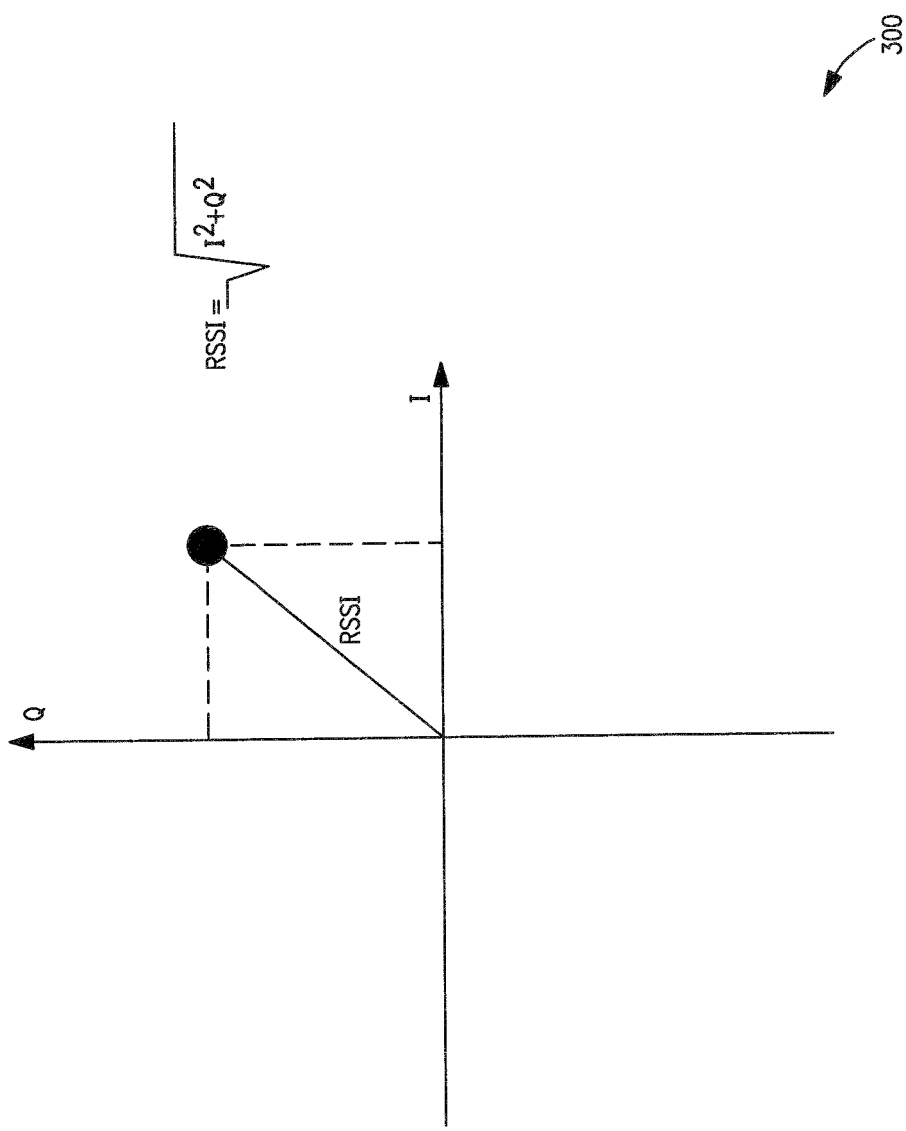
FIG. 3 is a graphical representation of one approach for Received Signal Strength (RSS) calculation useful in conjunction with the AGC calculation of various embodiments of the invention.
Figure 4:
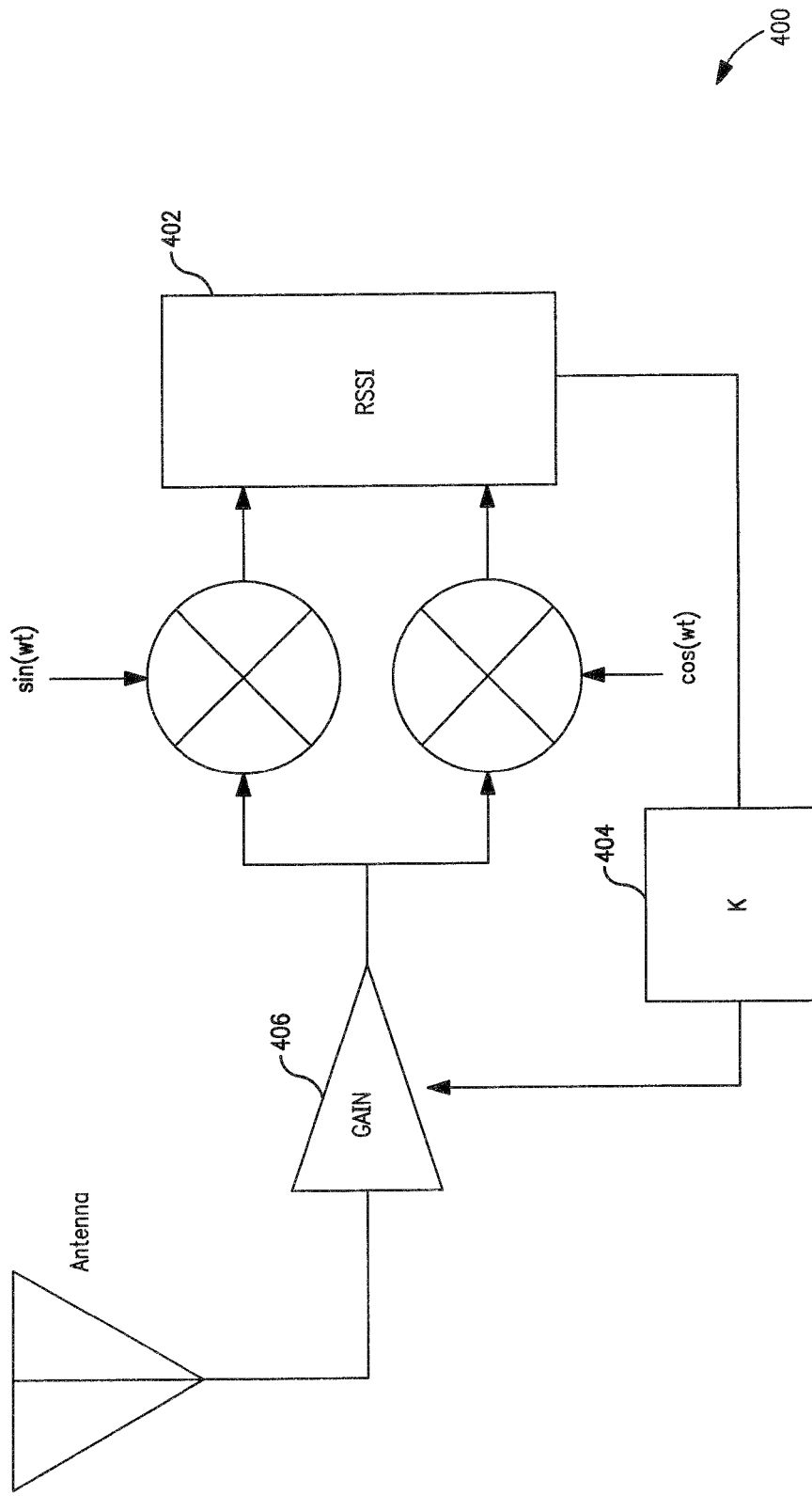
FIG. 4 is a logical representation of one exemplary Automatic Gain Control (AGC) feedback loop useful in conjunction with the present invention.

Common implementations of AGC use the Received Signal Strength Indication (RSSI) in a simple feedback loop to adjust for changes in the radio environment. FIG. 3 graphically illustrates one exemplary RSSI measurement 300. RSSI is calculated as the magnitude (or some derivative thereof) of the In-phase and Quadrature Components of the received signal. FIG. 4 illustrates one exemplary simple feedback loop 400 implementing AGC, based on RSSI (such as that obtained using the approach of FIG. 3). As shown, the RSSI is calculated 402, multiplied by a constant 404, and used as feedback to amplify 406 the incoming signal. Other embodiments may use comparisons between running energy estimation accumulators, etc.

The AGC constant is dynamically adjusted to correctly capture the entire range of the signal. For example, if the RSSI increases, the amplification is lowered. If the RSSI decreases, amplification is increased.

Example Operating Scenario—

Referring now to one exemplary scenario (illustrated in FIG. 5), a single UE is operating close to a relatively unoccupied NodeB. Recall that the received waveform comprises at least: the desired or "useful" channel (DPCH) 502, orthogonal or "ignored" channels (e.g., CPICH, signals for other users of the same cell site, etc.) 504, and noise (e.g., thermal noise, interfering cells, etc.) 506.

Figure 5:
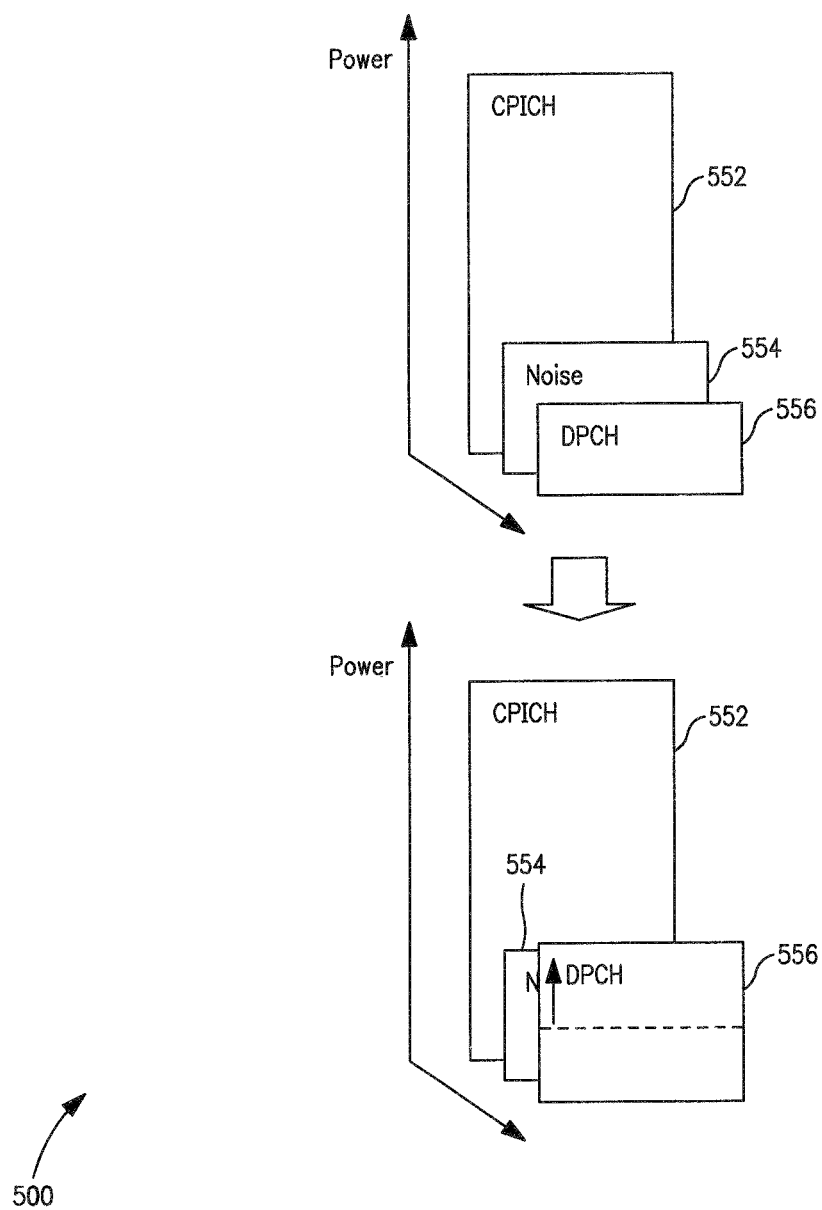
FIG. 5 is a graphical representation of a signal composition adapted to improve quantization noise in accordance with one exemplary embodiment of the present invention.

In the exemplary scenario of FIG. 5, the CPICH 502A dominates over the other elements (e.g., the DPCH 506A, noise 504A, etc.). Unfortunately, once the CPICH channel has been removed, the comparatively under-powered DPCH is subject to large quantization errors. Thus, as previously discussed, fixed point hardware used in typical wireless devices cannot represent the full signal fidelity necessary to separate between useful and ignored portions of the received signal, including in the aforementioned scenario.

To this end, one aspect of the present invention causes the wireless device and/or base station to adjust target resources based on estimations of network loading. In one exemplary embodiment, a ratio of the CPICH to the total received signals is used as an estimate of network load, although it will be appreciated that other metrics of network load can readily be used in place of (or in conjunction with) the foregoing ratio approach.

Specifically, in the exemplary embodiment, the CPICH $E_c/N_0$ (also commonly referred to as $CPICH/N_0$) measures the power allocated to the CPICH ($E_c$) relative to the total received power spectral density ($N_0$; interchangeably designated $I_0$). Total received power spectral density includes both desired signals and unwanted signal interference, as measured at the mobile station antenna connector. For example, a high $CPICH/N_0$ ratio indicates that the NodeB has clear transmission of the CPICH in a relatively noiseless environment; thus, the cell is (ostensibly) not supporting many other DPCHs.

The foregoing network load estimation is used in one implementation for dynamically adjusting a "safety margin", wherein the adjustment process is adapted to reduce quantization errors. Specifically, a larger safety margin is used when the $CPICH/N_0$ power ratio is large (e.g., above −7 dB); a smaller safety margin is used when the $CPICH/N_0$ power ratio is low (e.g., below −7 dB). It is appreciated that while a two-tier model (i.e., above or below −7 dB) is described, any number of different tiers and/or logical hierarchies can be employed if desired, consistent with the present invention. For instance, a three-tier model having two different safety margins and two thresholds might be used. Upon reaching the first threshold, the first safety margin is implemented, and if the second threshold is reached, the second margin implemented.

When the exemplary receiver notifies the NodeB that a high $CPICH/N_0$ is detected, the NodeB responsively boosts the transmit power of the corresponding DPCH using the safety margin. For example, increasing the DPCH transmit power by 25% is sufficient to remove quantization error in UMTS networks with little to no noise.

The "boost" in transmit power leverages the existing inner loop power control. Specifically, in this example, the NodeB increments its SIR target value. Since the NodeB must match a higher level of SIR for the UE, the power for the DPCH allocated to the UE is increased. In this exemplary case, normal operation of inner loop power control aims to hit a target SIR of 0 dB. During corrective operation, the inner loop power control aims to hit a target SIR of 1 dB (approximately 25% more transmit power, based on a doubling of power for every 3 dB increase). Inner loop power control can change as quickly as once every 0.66 ms in the illustrated implementation; thus, a certain amount of hysteresis is also included to prevent excessive "churn" or hunting in target SIR (i.e., once the CPICH/$N_0$ drops below −7 dB, the enhanced target SIR is still in effect for a short transitory hysteresis period). As shown, the CPICH 552 still dominates over the other elements; however, the DPCH power 556 is increased over the noise 554.

Lightly loaded cells will not be affected by the boosted DPCH transmit power 506B. When other equipment is not present within the cell, the NodeB can focus on increasing the DPCH power to reduce quantization error, thereby improving the receiver's call quality. When additional user equipment enters the cell, the effects of quantization error are reduced (as noise is increased), thus the NodeB can reduce the safety margin, or in some cases, revert to normal operation (i.e., no quantization adjustment).

The preceding example is purely illustrative, and other embodiments and variations are discussed in greater detail hereinafter. For example, alternative systems may measure/receive other indicia, utilize more complex adjustment margins or implementation criteria, monitor other conditional events, etc.

Additionally, while the foregoing examples are framed within a CDMA (Code Division Multiple Access) based UMTS cellular network, it is appreciated that the invention may be widely applied to other systems by artisans having ordinary skill in the relevant arts, given the contents of the present disclosure. For example, other multiple access schemes such as OFDMA (Orthogonal Frequency Division Multiple Access), TDMA (Time Division Multiple Access), FDMA (Frequency Division Multiple Access), and other CDMA based systems, each have analogous elements.

Similarly, other CDMA based schemes (e.g., IS-95, CDMA-2000, etc.) may utilize other indicia (e.g., pilot channels, synchronization channels, etc.) to estimate network loading, and adjust for quantization error.

Methods—

Figure 6:
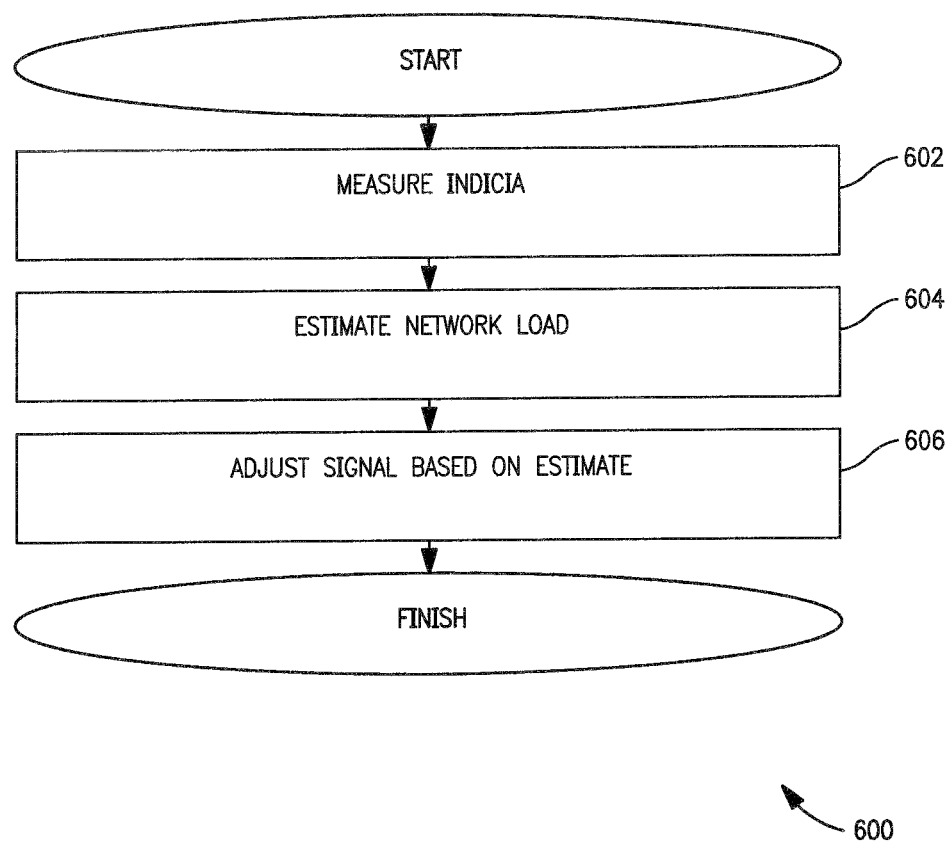
FIG. 6 is a logical flow diagram of an exemplary embodiment of the generalized process for improving signal reception based on one or more estimations of network load, in accordance with the present invention.

Referring now to FIG. 6, one embodiment of the generalized intelligent quantization margin procedure for adjusting signal reception based on one or more estimations of network load is described. The operative elements as described with respect to the methodology 600 of FIG. 6 are a client device (e.g., a mobile device, UE, or other user apparatus) and a serving device. Furthermore, the communication link includes at least: (i) one or more desired or "useful" signals, (ii) one or more undesired or "ignored" interfering signals, and (iii) noise.

At step 602, one or more indicia of related to network load are measured. In one embodiment, the indicia are measured at the client device. For example, in the previously described exemplary operation (see "Example Operating Scenario" discussion), the client device measured a ratio of Common Pilot Channel (CPICH) power to the total received signal ($N_0$) power. It is appreciated that such quantities are system dependent; other quantities may be readily substituted. Also, it should be noted that naming conventions can differ across technologies (e.g., $N_0$ may be equivalent to RSS (Received Signal Strength), $I_0$, etc.). In alternative embodiments, the indicia are measured at the serving device.

In one implementation of the invention, the aforementioned indicia include power measurements of one or more undesired signals. For example, the undesired signals may include at least one beacon signal. In one such variant, a pilot channel power is measured. As previously noted, the CPICH channel is typically removed during signal processing. Similar "undesired" signals may include other pilot channels, synchronization channels, common channels, control channels, dedicated channels for other users, etc.

At step 604 of the method 600 of FIG. 6, a network load is inferred or estimated, based on the one or more indicia of step 602 (or a combination thereof). In one embodiment, the one or more indicia (or a combination thereof) is/are compared to one or more acceptance or action criteria (e.g., threshold levels). One exemplary implementation of the utilizes a single threshold value as previously discussed; above the threshold, the network is presumed to be lightly loaded, whereas below the threshold, the network is presumed to be normally or heavily loaded. In the previously described exemplary operation (see "Example Operating Scenario" discussion above), the client device compared CPICH/$N_0$ to a set threshold (−7 dB). However, as previously noted, further gradated scales may be implemented; for example, multiple other thresholds may be established throughout the entire range of operation. Empirically measured ratios for CPICH/$N_0$ can span from −2.5 dB to −24 dB. For example, thresholds set at 3 dB increments (e.g., −5 dB, −8 dB, −11 dB, −14 dB, −17 dB, and −20 dB) could be easily implemented within fixed point designs.

In alternate embodiments, an estimated network load is deterministically calculated based on the one or more indicia (in contrast to comparison to a simple "yes/no" threshold). For example, the presumed network load may vary linearly, exponentially, logarithmically, etc., and this functional relationship can be used to calculate an actual load value in conjunction with the indicia (e.g., CPICH/$N_0$).

In some embodiments, the estimated network load (or the indicia useful for calculating it) is communicated to the serving device, the transmitting device (e.g., UE) performing the actual determination. Alternately, the estimated network load (or constituent components necessary to perform the calculation) may be calculated at the receiving (e.g., serving) device. In yet other embodiments, the network load may be estimated by a third party (e.g., a relay device, a master base station, network-connected third party entity or server, etc.). For example, certain technologies utilize other base stations to moderate and manage network operation. One such UMTS specific example includes the relationship between serving or master base stations, and non-serving base stations. Future cellular networks (e.g., Long Term Evolution (LTE)) may employ various forms of base stations including substantially limited base stations (e.g., microcells, femtocells, picocells, etc.). Such limited operation base stations may receive some information useful for determining network load (e.g., some indication of the radio resources available for usage, etc.).

As yet another implementation, two or more devices or entities may cooperate in a "distributed" fashion, such as where the UE performs some of the calculation or pre-processing of data, and then sends the pre-processed data to the server (or other entity) to complete processing. This approach can ostensibly save on upstream communication bandwidth, yet at the expense of increased processing overhead (and power consumption) at the client.

At step 606, the serving device adjusts signal transmission based on the inferred or estimated network load. In one exemplary embodiment, the power level of the one or more desired or "useful" signals is increased. For instance, in the previously described example, the DPCH is boosted by increasing the target SIR (Signal to Interference Ratio) of the Radio Resource Connection (RRC). A higher target SIR directly translates to a higher desired signal (DPCH) over other unwanted signals (e.g., including noise).

A number of other methods for improving reception of the useful signals may be substituted as well. For example, in other embodiments, the channel coding of the one or more desired or "useful" signals may be adjusted dynamically. As readily appreciated, various modulation constellations are more or less susceptible to quantization errors. For example, Binary Phase Shift Keying (BPSK) is less susceptible to quantization errors than Quadrature Phase Shift Keying (QPSK). Similarly, various higher-order constellations e.g., 16-QAM, 64-QAM, 256-QAM, etc. (Quadrature Amplitude Modulation) are progressively more quantization error prone than lower-order constellations. Accordingly, some higher-order constellations are only used for low noise environments. Hence, the higher order constellations may additionally consider the "sweet spot" range, in which (i) each symbol can be reliably distinguished over noise, and (ii) each symbol can be fully represented in the available fixed point hardware. For example, a tradeoff can be made between using high-order constellations with larger target SIRs, or conversely lowering the constellation order and retaining (or even lowering) the target SIR.

In other embodiments, additional hardware elements are activated or deactivated. In one such embodiment, the receiver enables supplemental fixed point extension hardware during high likelihood periods for quantization errors. For example, during normal operation, fixed point arithmetic is set to eight (8) bits. During appropriate situations, additional extension hardware is enabled, supporting fixed point arithmetic of ten (10), twelve (12) bits, etc. In yet other embodiments, the transmitter and receiver may enable specialized modulation or transmission rate hardware.

Moreover, it should also be noted that constellation symbols are highly susceptible to quantization errors, whereas transmission rate is not. Since the raw data rate is a combination of constellation complexity and transmission rate, it is appreciated that a tradeoff between these two factors may influence serving device operation. For example, the serving device may determine that the desired signal should be transmitted using the same constellation at the same rate, but increasing the transmit power. Alternatively, the serving device may switch to a faster transmit rate using a lower complexity constellation; so as to remain at the same transmit power. Other variations are described in greater detail subsequent hereto (see "Exemplary Base Station Apparatus, Exemplary Mobile Apparatus" discussions presented below).

Figure 7:
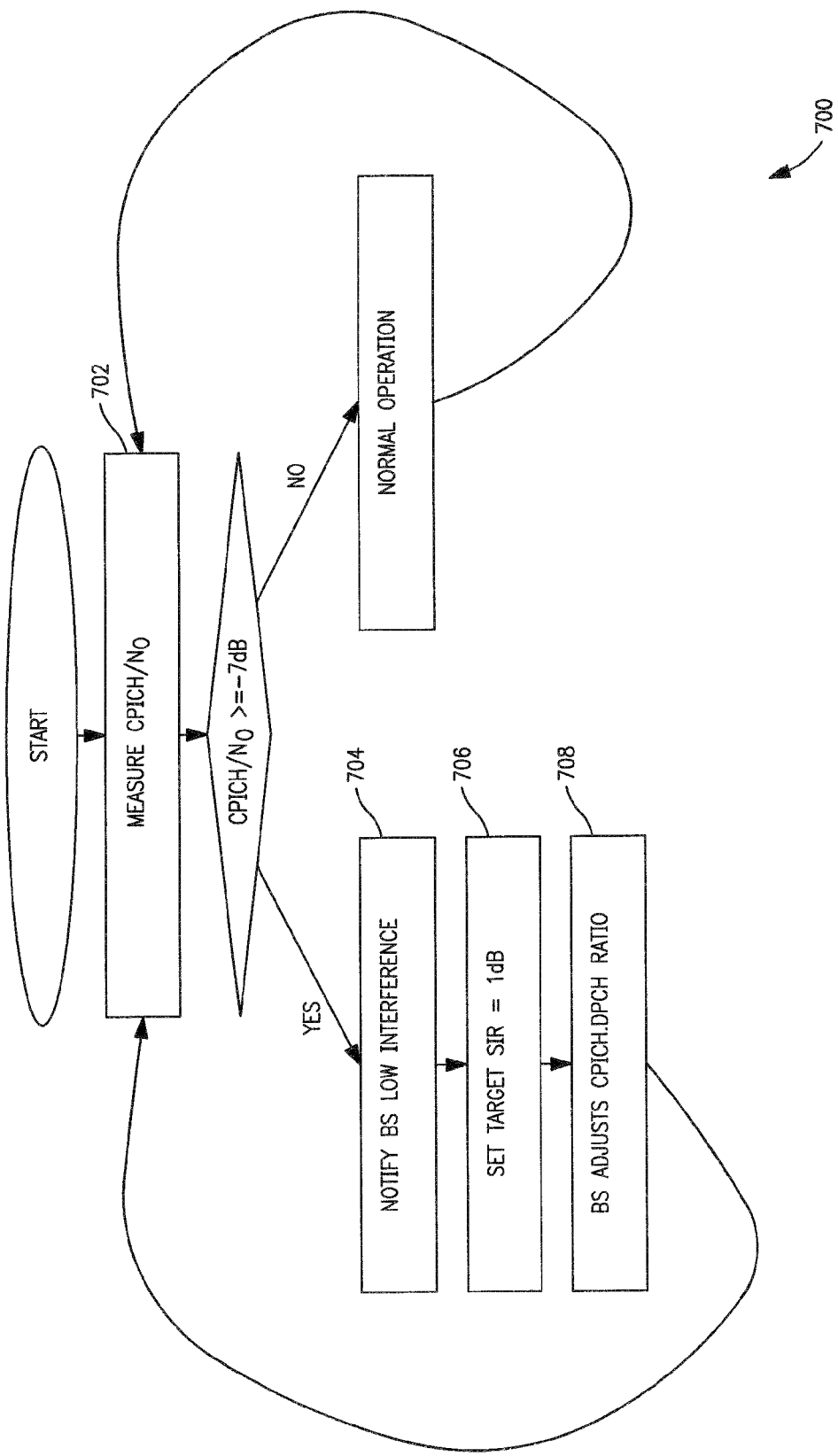
FIG. 7 is a logical flow diagram illustrating one exemplary implementation of the method of FIG. 6.

Referring now to FIG. 7, one exemplary implementation of the generalized method of FIG. 6 for improving signal reception based on one or more estimations of network load 700 is illustrated. At step 702, the CPICH and $N_0$ are measured. The CPICH $E_c/N_0$ is highly correlated to the network load of the NodeB. If the CPICH/$N_0$ exceeds −7 dB, then the mobile device assumes that the NodeB is operating with very little network load. In contrast, if the CPICH/$N_0$ is below −7 dB, then the mobile device assumes that the NodeB is operating with normal loads.

The exemplary receiver notifies the NodeB that the network load appears to be too low; i.e., that quantization error may be a factor in Quality of Service (QoS) (704). The NodeB responsively selects from one or more corrective options. For example, as shown, at step 706, the NodeB sets the target SIR to a higher minimum requirement (1 dB).

Since the NodeB must match a higher level of SIR for the UE, the NodeB increases the DPCH power, respective to the CPICH (708).

In alternate embodiments, the NodeB may configure other parameters to reduce quantization noise experienced by the receiver. For example, other embodiments may select between increasing target SIR, changing transmission rates, changing constellation orders, etc.

Exemplary Base Station Apparatus—

Figure 8:
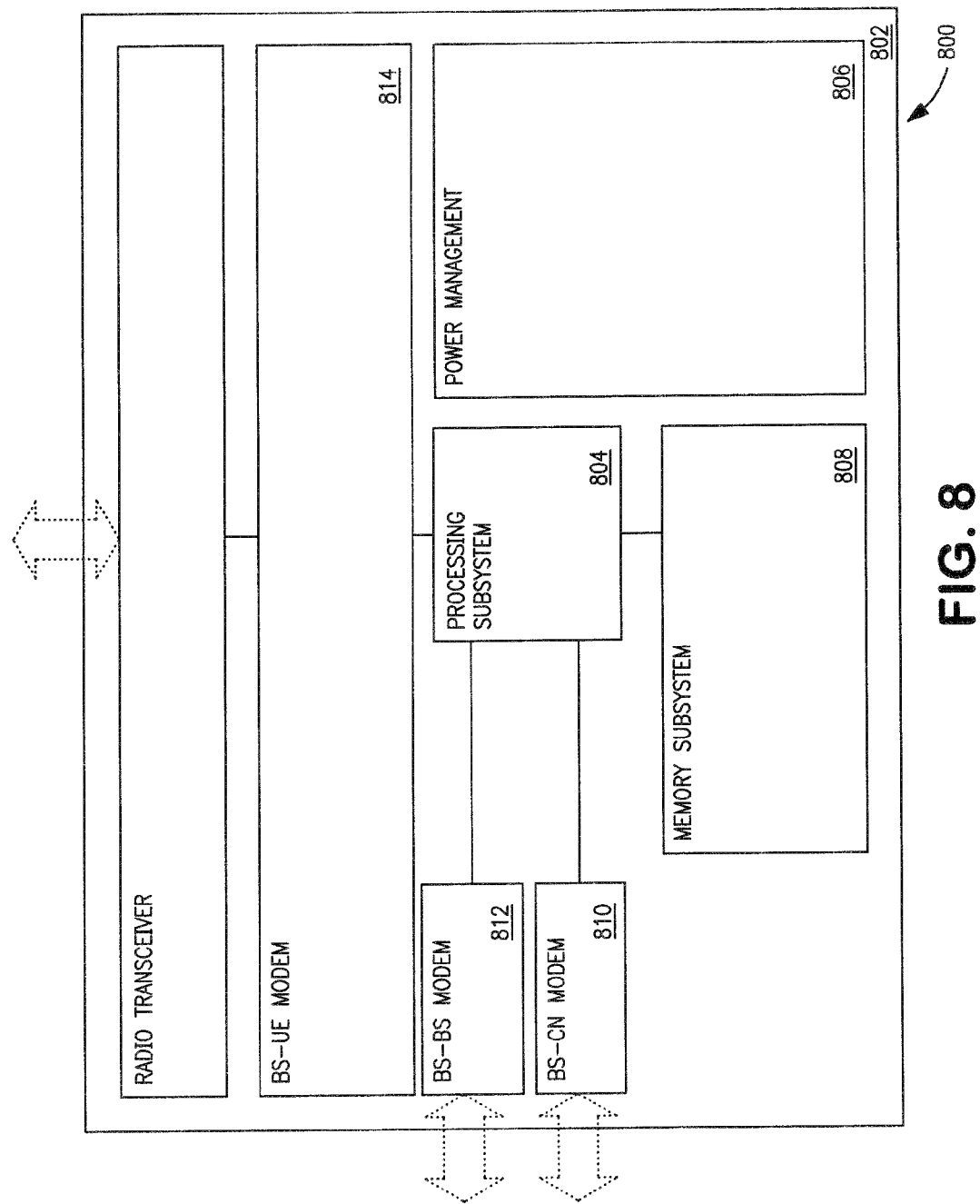
FIG. 8 is a block diagram of one embodiment of a generalized serving apparatus configured in accordance with the present invention.

Referring now to FIG. 8, exemplary base station apparatus 800 implementing the functionality previously described above is illustrated and described. The base station apparatus 800 of the illustrated embodiment generally takes the form factor of a stand-alone device for use in a cellular network, although other form-factors (e.g., femtocells, picocells, access points, mobile hotspots, components within other host devices, etc.) are envisaged as well.

The apparatus of FIG. 8 includes one or more substrate(s) 802 that further include a plurality of integrated circuits including a processing subsystem 804 such as a digital signal processor (DSP), microprocessor, PLD or gate array, or plurality of processing components, RF transceiver(s), as well as a power management subsystem 806 that provides power to the base station 800.

The processing subsystem 804 includes in one embodiment an internal cache memory, or a plurality of processors (or a multi-core processor). The processing subsystem 804 is preferably connected to a memory subsystem 808 which may comprise SRAM, Flash, SDRAM, etc. The memory subsystem may implement one or a more of DMA type hardware, so as to facilitate rapid data access.

The exemplary apparatus 800, in some embodiments, implements some form of broadband access 810 to a Core Network entity, and/or access 812 to other apparatus 600. For instance, the broadband access may be provided by a DSL connection (i.e., via DSL subsystem), although other interfaces, whether wired or wireless, may be used in place of or in combination with the DSL subsystem. It is recognized by one of ordinary skill that other broadband access schemes such as DOCSIS cable modem, T1 line, WiMAX (i.e., IEEE Std. 802.16), ISDN, FiOS, microwave link, satellite link, etc. could be readily substituted, or used in tandem with the aforementioned DSL interface.

The base station apparatus 800 also includes one or more RF modem subsystems. The modem subsystems 814 enable the base station to provide service to one or more subscriber devices. It is readily appreciated that in some implementations of the invention, multiple subsystems may be required. For example, a base station may provide multiple RF modem subsystems to provide, inter alia, multi-mode operation (e.g. GSM, GPRS, UMTS, and LTE) over multiple distinct air interfaces. The modem subsystems 814 include a modem, RF frontend, and one or more antennas.

It is further noted that in some embodiments, it may be desirable to obviate some of the components presently illustrated (such as RF frontend), or alternatively, the discrete components illustrated may be merged with one another to form a single component.

As previously described, base station implementations of the invention generate signaling for a communication link to one or more recipient devices; the communication link is composed of a number of signals. Furthermore, at least one or more desired or "useful" signals are addressed to the one or more recipient devices. The invention enabled base station additionally generates signaling which is undesired or "ignored" for at least one or more of the recipient devices.

In one exemplary UMTS embodiment, a NodeB base station apparatus 800 generates a Common Pilot Channel (CPICH) 552 to provide all user equipment (UE) with a common synchronization signal. The NodeB base station apparatus also generates Dedicated Physical Channels (DPCH) 556 to provide channels for control (Dedicated Physical Control Channel (DPCCH)), and data (Dedicated Physical Data Channel (DPDCH)) messaging devoted to single UEs. Each DPCH is only received by one recipient UE.

The exemplary UMTS NodeB base station apparatus 800 is further adapted to receive one or more indicia associated with an estimated or calculated network load. As previously described, the UMTS NodeB is adapted to generate or receive measurements of $CPICH/N_0$, which represents a measurement of the CPICH power to the total received signal power. It is appreciated that the foregoing indicia may be readily substituted with analogous indicia of the type previously described herein by one of ordinary skill, given the contents of the present disclosure.

In one aspect of the present invention, the NodeB 800 can dynamically adjust DPCH 556 modulation characteristics to reduce the impact and/or likelihood of quantization error. In one exemplary embodiment, the adjustment entails increasing DPCH transmit power when an indicia associated with an estimate/determination of network load exceeds one or more threshold values. In alternate embodiments, the DPCH transmit power may be calculated via an algorithm, so as to enable adjustment in linear, exponential, logarithmic, etc. progressions.

Furthermore, as previously mentioned, yet other alternative embodiments may improve quantization error rejection. Quantization error affects various aspects of channel coding differently. Transmission power, antenna configuration, constellation type, transmission rate, channel coding complexity, supplemental hardware operation, etc. are each subject to different degrees of quantization error susceptibility. Thus, in one implementation, the base station apparatus "intelligently" considers channel coding methods which reject both noise, and quantization error, such as via a computer program or other computerized logic implementing such functions.

Various channel coding methods are more or less susceptible to quantization errors. For example, constellation type can be greatly affected by quantization errors; in comparison, transmission rate is largely independent of quantization error. Thus, in another aspect of the invention, an operational rules engine related to the quantization error reduction techniques described herein is provided. This engine comprises, in an exemplary embodiment, a series of software routines or other associated hardware/firmware environment adapted to control the operation of the channel coding based on one or more operational considerations.

For example, rules implemented by the rules engine may be codified as a series of preferences or a logical hierarchy (e.g., changes to transmission power are preferred over changes to transmission rate; changes to constellation are preferred over changes to transmission power, etc.). Additionally, the rules engine may consider additional operational aspects beyond mere channel coding quality; for example, other aspects may include elements such as Quality of Service (QoS), subscriber permissions, business considerations, etc.

Other variants of the base station operation including channel coding implementations, and rules engines parameters, may be readily implemented by an artisan of ordinary skill, given the present disclosure.

Exemplary Mobile Apparatus—

Figure 9:
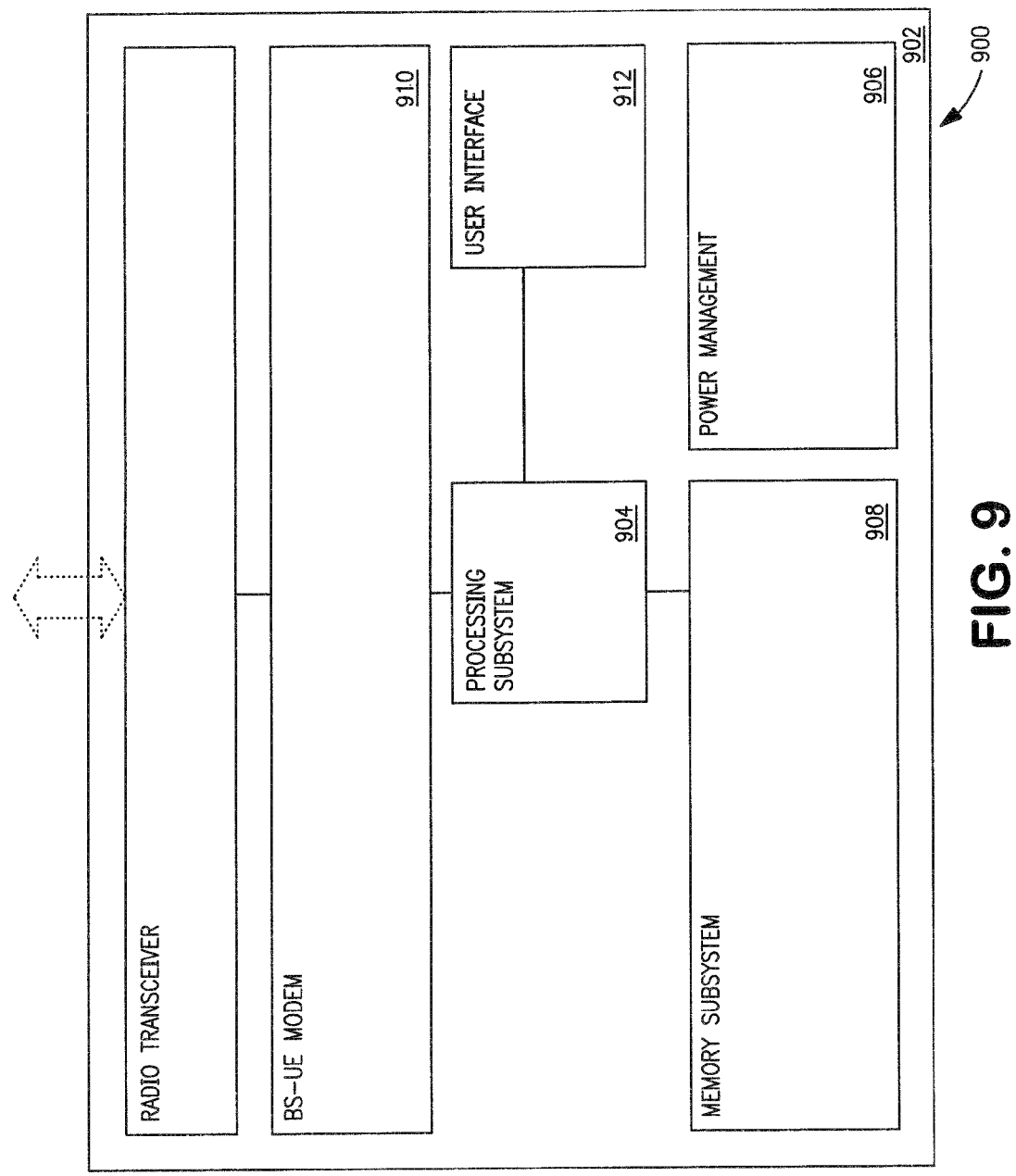
FIG. 9 is a block diagram of one embodiment of a generalized receiving apparatus configured in accordance with the present invention.

Referring now to FIG. 9, exemplary client (e.g., UE) apparatus 900 implementing the methods of the present invention is illustrated.

The UE apparatus 900 includes a processor subsystem 904 such as a digital signal processor, microprocessor, field-programmable gate array, or plurality of processing components mounted on one or more substrates 902. The processing subsystem may also comprise an internal cache memory. The processing subsystem 904 is connected to a memory subsystem 908 comprising memory which may for example, comprise SRAM, Flash and SDRAM components. The memory subsystem may implement one or a more of DMA type hardware, so as to facilitate data accesses as is well known in the art.

The radio/modem subsystem 910 comprises a digital baseband, analog baseband, TX frontend and RX frontend. The apparatus 900 further includes an antenna assembly to receive service from one or more base station devices 800. While specific architecture is discussed, in some embodiments, some components may be obviated or may otherwise be merged with one another (such as RF RX, RF TX and ABB combined, as of the type used for 3G digital RFs) as would be appreciated by one of ordinary skill in the art given the present disclosure.

The illustrated power management subsystem (PMS) 906 provides power to the UE, and may comprise an integrated circuit and or a plurality of discrete electrical components. In one exemplary portable UE apparatus, the power management subsystem 906 advantageously interfaces with a battery.

The user interface system 912 includes any number of well-known I/O including, without limitation: a keypad, touch screen, LCD display, backlight, speaker, and microphone. However, it is recognized that in certain applications, one or more of these components may be obviated. For example, PCMCIA card type UE embodiments may lack a user interface (as they could piggyback onto the user interface of the device to which they are physically and/or electrically coupled).

The apparatus 900 may further include optional additional peripherals including, without limitation, one or more GPS transceivers, or network interfaces such as IrDA ports, Bluetooth, WLAN, and/or WiMAX transceivers, USB, FireWire, etc. It is however recognized that these components are not required for operation of the UE in accordance with the principles of the present invention.

In the illustrated embodiment, the modem subsystem 910 additionally includes subsystems or modules for receiving signaling for a communication link generated by one or more serving devices 800; wherein the communication link comprises a number of signals. Additionally, the modem subsystem is adapted to separate (physically via filters, or logically via arithmetic operations) at least one or more desired or "useful" signals from undesired signals.

In one exemplary UMTS implementation, the mobile device apparatus 900 (UE) is adapted to receive one or more DPCHs (Dedicated Physical Channels) 556 intermixed with a Common Pilot Channel (CPICH) 552. The exemplary UMTS UE apparatus 900 is further adapted to calculate and communicate one or more indicia associated with an estimated network load. As previously described, the UE is adapted to measure $CPICH/N_0$ which represents a measurement of the CPICH power to the total received signal power. As with the base station apparatus, the foregoing indicia may be readily substituted with analogous indicia by one of ordinary skill, given the contents of the present disclosure.

The $CPICH/N_0$ measures the power allocated to the CPICH ($E_c$) relative to the total received power spectral density ($N_0$). $CPICH/N_0$ is commonly measured by UMTS receivers for handover/hand-off operation (the $CPICH/N_0$ of each base station within an "active set" is tracked, for efficient cell selection). In the exemplary UE 900, $CPICH/N_0$ is measured within a CDMA rake receiver adapted to search and correlate code "fingers". In one embodiment, one or more conditional events (e.g., the detection of unusually high $CPICH/N_0$) trigger the delivery of a message to the relevant serving apparatus 800. Once the exemplary UE 900 transmits the one or more indicia to the serving apparatus 800 (base station), the serving apparatus modifies the DPCH channel qualities (e.g., power allocated to a DPCH, etc.) to improve quantization error rejection.

Alternative embodiments of the UE 900 may directly activate or deactivate internal hardware, thereby improving quantization error rejection. For example, in one such embodiment, the receiver may have supplemental fixed point extension hardware which is only active during high likelihood periods for quantization errors. During normal operation, fixed point arithmetic is set to eight (8) bits, and additional extension logic is held in reset. When triggered in appropriate situations, the additional extension hardware can be pulled out of reset to supporting fixed point arithmetic of ten (10), twelve (12) bits, etc. Other variants of this scheme may simply power down extension hardware, further improving power consumption when not in use.

For example, one extendable hardware embodiment utilizes longer fixed point A/D conversion components. During normal operation, the extra least significant bits (LSBs) or most significant bits (MSBs) are ignored. After enabling extension hardware, the extra bits are passed to the extension logic, providing the additional granularity to reduce quantization error.

Other mobile device variants are readily implemented by an artisan of ordinary skill, given the present disclosure.

OFDMA Networks—

Figure 10:
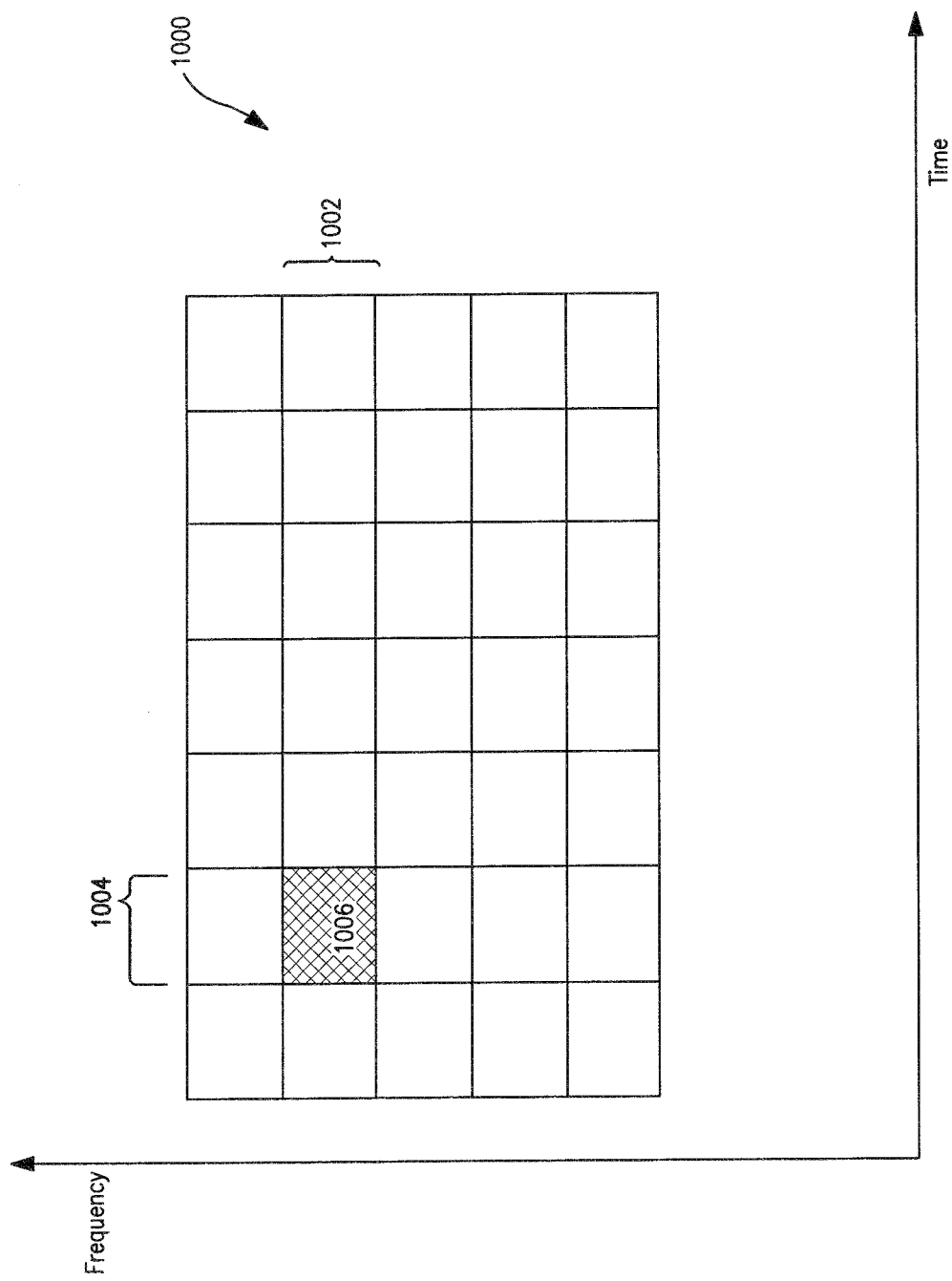
FIG. 10 is time and frequency representation of an Orthogonal Frequency Division Multiple Access (OFDMA) implementation useful in conjunction with various embodiments of the invention.

Consider OFDMA (Orthogonal Frequency Domain Multiple Access) scheme 1000 of FIG. 10 which partitions the entire frequency band into subcarriers 1002 which are further divided into time slots 1004; each subcarrier timeslot combination is a time-frequency resource 1006. Each receiver is allocated a number of the time-frequency resources. Common implementations of OFDMA receivers and transmitters use a Fast Fourier Transform (FFT) and Inverse Fast Fourier Transform (IFFT), Each receiver must perform a FFT on the entire radio resource band (including unwanted time-frequency resources), to extract their desired time-frequency resources. The transmitter must transmit with enough power to ensure that the receiver has sufficient fidelity to extract the desired time-frequency resources.

In scenarios where various time-frequency resources have varying power levels, the FFT or IFFT operation will be dominated by the more powerful time-frequency resource. Thus, in some scenarios, low powered time-frequency resource components may not have enough fidelity to be successfully extracted.

For example, during normal operation a base station which is transmitting downlink OFDM signals to a number of receivers must adjust the transmission power of each subcarrier dynamically, to compensate for effects such as fast fading specific to each receiver, etc. Unfortunately, as previously noted, each receiver demodulates the entire frequency resource with an FFT. Consequently, nearby devices receive waveforms which are dominated by transmit power of unwanted time-frequency resources. More specifically, as the time sampled data is converted to the frequency domain to separate the carrier into the constituent subcarriers, the subcarrier allocated to the nearby receiving device is relatively insignificant compared to the subcarriers which have been boosted due to fast fading effects.

Thus in accordance with various aspects of the present invention, the OFDMA base station can use a minimum safety margin for nearby receivers. The minimum safety margin ensures that every recipient can demodulate the time-frequency resources, without quantization error.

Similarly, during normal operation a base station which is receiving uplink OFDM signals from a number of receivers may require the nearby mobile devices to ratchet down their transmission power and the farther away mobile devices to ratchet up their transmission power. However, the base station must receive still receive sufficient signal quality from the nearby device to avoid quantization errors. Thus, in this example, the BS may require the nearby device to boost the uplink signal strength by a safety margin to remove quantization error.

Business/Operational Rules Engine—

The degree of tolerance allowed by the base station for quantization rejection may be directly related to various desirable qualities for the subscriber; however, the inventive solution does sometimes operate at the cost of other network operations. For example, increasing DPCH transmission power improves reception by a first subscriber, yet also adversely affects neighboring subscribers. Thus, in another aspect of the invention, a business rules engine related to the quantization error avoidance apparatus and techniques described herein is provided. This engine comprises, in an exemplary embodiment, a series of software routines or other associated hardware/firmware environment adapted to control the operation of the quantization error reduction operations previously described.

In effect, the business rules engine comprises a supervisory entity that monitors and selectively controls the congestion management and avoidance functions at a business (e.g., revenue, profit, and/or QoS level), so as to implement desired business rules. The rules engine can be considered an overlay of sorts to the basic quantization error management/avoidance algorithms. For example, the foregoing invention is well suited to providing high data rates in relatively pristine reception conditions. Thus, in one such model, a service provider/network operator may provide quantization-free boosted data services to customers willing to pay a premium, as an incentive for its higher-tier customers, or even subsidized by other $3^{rd}$ parties.

Certain business models may offer such desirable qualities embodied in premium equipment. For example, home use femtocells may support such preferential services. In yet other models, a cellular network operator may provide various levels of quantization resistance. For instance, all UEs with a high data rate may be grouped within a first class, and lower data rate UEs may be grouped within a second class. Service may be provided to both first and second class UEs, where the UEs of the second class have different resistance (e.g., higher $CPICH/N_0$ thresholds, etc.)

In yet another aspect of the present invention, it is appreciated that the foregoing solution may be used to enable otherwise less capable devices. For example, a device having only six (6) bits of fixed bit resolution could be utilized within a relatively clear channel. Within UMTS networks, such devices would always require higher DPCH power. The implications of limited operation for low cost, low capability devices may have many desirable business applications. Thus, given the present disclosure artisans may determine that lower cost implementations, having smaller fixed point arithmetic implementations may be implemented. Such designs must still reliably distinguish each symbol over noise; however the designs greater susceptibility to quantization error can be overcome by increasing transmit power.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for improving quantization rejection of at least one signal among a plurality of signals and noise, the plurality of signals including at least one other known signal, comprising:
   transmitting the plurality of signals;
   receiving information related to an estimated network load based on a measured first attribute; and
   adjusting transmission characteristics of at least one but not all of the plurality of signals based on the information;
   wherein the first attribute comprises a ratio of a first parameter of a network to a second parameter of the network.

2. The method of claim 1, wherein the first parameter of the network comprises a common channel power of a common channel, and the second parameter of the network comprises a total received signal power.

3. The method of claim 2, wherein the network is compliant with a Universal Mobile Telecommunications System (UMTS) standard(s), and the common channel comprises a common pilot channel (CPICH).

4. The method of claim 1, additionally comprising:
   comparing the received information to at least one criterion; and
   based at least in part on a result of the comparing, selectively adjusting the transmission characteristics.

5. The method of claim 1, wherein the act of adjusting the transmission characteristics includes signal amplification.

6. The method of claim 1, wherein the act of adjusting the transmission characteristics includes lowering a constellation order.

7. The method of claim 1, wherein the act of adjusting the transmission characteristics includes changing a transmission rate.

8. The method of claim 1, wherein the act of adjusting the transmission characteristics includes changing one or more feedback parameters.

9. A method for enhancing quantization performance of at least one radio signal among a plurality of radio signals, comprising:
   transmitting the plurality of radio signals, the transmission having a first radio attribute;
   receiving information related to a network load based on the first attribute; and
   adjusting the transmission characteristics of the at least one radio signal among the plurality of signals based on the information;
   wherein the first radio attribute comprises a ratio of a common channel power to a total received signal.

10. The method of claim 9, wherein the act of adjusting comprises:
    comparing the ratio to at least one threshold criterion; and
    based at least in part on the result of the comparing, selectively performing the adjusting of the transmission characteristics.

11. The method of claim 9, wherein the at least one radio signal is a dedicated channel.

12. The method of claim 9, wherein the plurality of radio signals includes at least one common signal, at least one unwanted signal, and at least one wanted signal.

13. The method of claim 12, wherein the act of adjusting the transmission characteristics includes signal amplification of the at least one wanted signal.

14. The method of claim 12, wherein the act of adjusting the transmission characteristics includes lowering a constellation order of the at least one wanted signal.

15. The method of claim 12, wherein the act of adjusting the transmission characteristics includes changing a transmission rate of the at least one wanted signal.

16. The method of claim 12, wherein the act of adjusting the transmission characteristics includes changing one or more feedback parameters of the at least one wanted signal.

17. A wireless apparatus, the apparatus comprising:
    a wireless interface, the wireless interface configured to receive a plurality of signals;
    logic configured to determine a network load;
    a processing device coupled to a memory; and
    a computer program comprising a plurality of executable instructions resident within the memory that, when executed by the processing device causes the wireless apparatus to:
    receive a first signaling channel via the wireless interface;
    request a second signaling channel;
    estimate a network load based on a ratio of a first parameter of the network to a second parameter of the network; and
    transmit information relating to the estimated network load;
    wherein the transmitted information is configured to adjust one or more reception characteristics of the second signaling channel.

18. The apparatus of claim 17, wherein the wireless interface has multiple fixed point capabilities, and wherein the fixed point capability is a reception characteristic determined by the information.

19. The apparatus of claim 17, wherein the reception characteristic is a target signal to interference (SIR) level.

20. The apparatus of claim 17, wherein the reception characteristic is negotiated with a serving device.

21. The apparatus of claim 17, wherein the information relating to the estimated network load comprises an indication of a signal strength of the first signaling channel, relative to signal strengths of a plurality of signals.

22. A serving apparatus, the apparatus comprising:
    a wireless interface, the wireless interface configured to transmit and receive a plurality of signals;
    a processing device coupled to a memory; and
    a computer program comprising a plurality of executable instructions resident within the memory that, when executed by the processing device cause the serving apparatus to:
    receive a network load estimation via the wireless interface from a mobile device; and responsively adjust one or more transmission characteristics of at least one, but not all, of the plurality of signals to the mobile device;

wherein the network load estimation is based on a ratio of a first parameter of a network to a second parameter of the network.

23. A method for compensating for one or more orthogonal signals having much higher transmission power than a user signal, and resulting quantization error in the user signal, the method comprising:

obtaining a network load estimation, the network load estimation based on a ratio of a first parameter of a network to a second parameter of the network; and responsively adjusting one or more transmission characteristics of the user signal based at least in part on the network load estimation, the adjusting mitigating the quantization error.

24. The method of claim 23, wherein the one or more orthogonal signals comprises a pilot channel, and the adjusting the one or more transmission characteristics of the user signal comprises increasing a transmission power of the user signal.

* * * * *